April 22, 1969 W. A. McRAE ET AL 3,440,159
SEPARATION OF UN-IONIZED SUBSTANCES BY ELECTRO-OSMOSIS
Filed Aug. 26, 1965 Sheet 1 of 4

INVENTORS
WAYNE A. MC RAE
WILLIAM E. KATZ
BY
ATTORNEYS

L="LOOSE" CATION SELECTIVE MEMBRANE
T="TIGHT" CATION SELECTIVE MEMBRANE

FIG. 6

L="LOOSE" CATION SELECTIVE MEMBRANE
T="TIGHT" CATION SELECTIVE MEMBRANE

United States Patent Office 3,440,159
Patented Apr. 22, 1969

3,440,159
SEPARATION OF UN-IONIZED SUBSTANCES BY ELECTRO-OSMOSIS
Wayne A. McRae, Lexington, and William E. Katz, Boston, Mass., assignors to Ionics, Incorporated, Watertown, Mass.
Filed Aug. 26, 1965, Ser. No. 482,729
Int. Cl. B01k *3/10;* B01d *3/02*
U.S. Cl. 204—180     8 Claims

ABSTRACT OF THE DISCLOSURE

The invention is directed to a process and apparatus for separating low molecular weight un-ionized substances from liquid mixtures such as sugar solutions containing the same by electro-osmosis. The electro-osmosis is effected in an electrolytic cell wherein alternating "tight" and "loose" ion exchange membranes define the chambers therein from which the low molecular weight substances are removed from the high molecular weight substances from their respective alternating chambers.

---

This invention relates to the electrical separation of low molecular weight substantially un-ionized substances from liquid mixtures thereof with other substances. More particularly, the invention is concerned with separation or electrowining of un-ionized or only partially ionized substances of low molecular weight (crystalloids) from high molecular weight substances (colloids) in aqueous solution by causing the former to migrate under the influence of an electric potential across ion selective membranes which are substantially impermeable to the high molecular weight substances (colloids). For example, such low molecular weight un-ionized substances as phenol, furfural, xylose, arabinose, sucrose, lactose, fructose, mannose, maltose, dextrose, etc., may be separated in accordance with the present invention from such high molecular weight substances as albumin, casein, polysaccharides, lignin, dextrin, etc. As a more specific example, the electrowining of lactose from proteins present in whey-molasses is accomplished by passing an electric current through a multiple chamber apparatus having a pair of end electrodes separated by alternating "loose" or semipermeable, and "tight" or impermeable ion selective membranes, the loose membranes being substantially permeable to the soluble low molecular weight substances but substantially impermeable to the high molecular weight substances, and the tight membrane being substantially impermeable to both the low and high molecular weight substances. Under the influence of an electric potential, both membranes are permeable to ordinary inorganic ions.

It is an object of this invention to provide a process and apparatus for the electrical separation of un-ionized substances from liquid mixtures thereof with other materials employing ion exchange membranes.

Another object of this invention is to provide a simple, economical and effective separation employing the principle of electroosmosis with a multiplicity of cell pairs wherein two ion exchange membranes of the same charge sign are employed in defining treatment cells, such membranes having different porosities hereinafter defined as "loose" and "tight."

These and other objects, features and advantages of the invention will appear more fully from the detailed description which follows accompanied by the drawings. To better understand the invention, the description is made with specific reference to certain preferred embodiments and with reference to the separation of the crystalloids from the colloids in aqueous syrups; however, it is not to be construed as limited thereto except as defined in the appended claims. By way of example, the use of this invention for the separation of low molecular weight constituents from the high molecular weight constituents in a syrup will now be described in detail with reference to the accompanying drawings in which:

Figure 1:
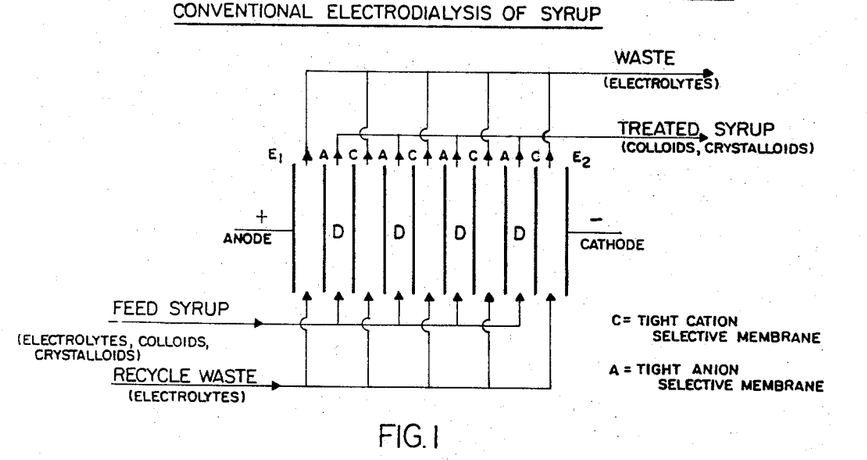
FIGURE 1 is a schematic diagram of a conventional multicompartment electrodialytic process for demineralizing an aqueous syrup consisting of electrolytes, colloids and crystalloids with conventional crystalloid impermeable, colloid impermeable, ion-selective membranes.

FIGURE 1 represents a conventional multicompartment electrodialytic apparatus and process for demineralizing a syrup consisting of electrolytes, colloids and crystalloids by the use of an alternating sequence of conventional anion selective (A) and cation selective (C) ionically conducting membranes, arranged between a single set of electrodes $E_1$ and $E_2$. If $E_1$ is an anode then the Feed Syrup is passed into the demineralizing compartments (D), that is, those compartments which are bounded on the anode side by anion selective membranes and on the cathode side by cation selective membranes. Commercially available membranes of this type are generally ion exchange resins in sheet form as disclosed, for example, in the Clarke patents U.S. Nos. 2,731,411 and 2,730,768 both issued on Jan. 17, 1956. For example, a commercial cation selective membrane may consist of a crosslinked polystyrene matrix to which are bonded nuclear sulfonate groups and a commercial anion selective membrane may consist of a crosslinked polystyrene matrix to which are bonded trimethylaminomethyl groups. Such membranes may be reinforced with webs of woven cloth, non-woven mats or matrices of polymers which are not ion exchange active. These reinforcing webs generally improve the mechanical properties of the membranes but reduce the diffusion permittance and electrical conductance per unit area. Many of the other eletrochemical properties of the membranes are usually only slightly affected by the presence of the reinforcing web. One of these properties is the electro-osmotic water transfer, referred to hereinafter as the water transfer. This property of commercial ion selective membranes is generally not well understood. It refers to the empirical fact that each ampere of electric current passing through an ion selective membrane is accompanied by about 4 milliliters of water per hour. This water transfer is usually in the same direction as the movement of the principal ions passing through the membrane.

Referring to FIGURE 1, the water transfer across the anion selective membranes is usually toward the anode while that across the cation selective membranes is usually toward the cathode. We have also found that the amount of such water transfer depends in a complex way, which is not well understood, on the nature of the ions transferred, and on the water content of the ion exchange resin component (i.e., grams of water per gram of bone dry ion exchange resin component of the membrane). We have found that, other things being equal, membranes with high water content will also have high water transfer of the order of 10 milliliters per hour per ampere; and those with low water content will have low water transfer of the order of about 1 milliliter per hour per ampere. Ions which have poor electrolyte conductivity in the membrane are found to contribute high water transfer but ions which have good electrolytic conductivity are found to contribute low water transfer. With respect to the process of FIGURE 1, there will thus be an electrical transfer of water from the Feed Syrup through the ion selective membranes into the Waste. We have found that the amount of such transfer can be controlled by selecting the water content of the ion selective membranes. As pointed out above, the water transfer is partly determined by the nature of the ions in the Feed Syrup. The nature of such ions is not normally within the control of the electrodialysis practitioner. In the conventional electrodialysis of syrup, the water transfer is not accompanied by a substantial transport of crystalloids (e.g. sucrose or lactose) or colloids (e.g. dextrins or proteins). We believe this is because the interstices in the ion exchange resin substance which are occupied by water have characteristic dimensions which are smaller than those of the crystalloids. Although references may be found in the literature to "pores" and "pore sizes" in ion selective membranes, we believe that such pores do not exist in the conventional sense of a small opening, foramen, perforation or orifice. We believe, instead that on an ultramicroscopic scale, the ion exchange resin polymer must resemble compacted cotton fibers. The water in the membranes then occupies the space not occupied by the polymeric moieties (the fibers in the analogy). We use the word "interstices" to designate such water-containing interstices and the phrase "characteristic dimensions of the interstices" to designate a value which in some way characterizes the average minimum aperture in any conducting path through an ion selective membrane.

The apparatus and process of FIGURE 1 has been used to demineralize, for example:

(a) Concentrated whey;
(b) Cane sugar mill syrups;
(c) Cane sugar refinery affination syrups;
(d) Corn starch hydrolyzate syrups;
(e) Beet sugar syrups; and
(f) Spent sulfite pulping liquors.

Although the process has been commercially successful, it suffers from two economic objections. First, many naturally or industrially occurring syrups of electrolytes, crystalloids and colloids contain substances which become absorbed on either the anion selective or cation selective membranes and which interfere with the electrodialysis operation. Generally, the interference is observed by a substantial decrease in the electrical conductance of one of the two types of membranes. We believe the absorbed substances occupy ion exchange sites in the surfaces of the affected membranes and thereby temporarily reduce the intrinsic conductance of the ion exchange resin. Membranes having substantial amounts of such absorbed substances are said to be "fouled." The absorbed fouling substances will usually be desorbed if the membranes are allowed to stand in water or are reused with water. This means that an electrodialysis plant may have to be operated substantially less than full time or that two or more sets of the sensitive membranes may have to be rotated in and out of operation. These expedients add to the cost of the electrodialysis operation. It is possible to hasten the desorption by treating the affected membranes with appropriate solutions of acids, alkalies, salts and/or solvents, the composition depending on the nature of the fouling substance. While such treatment is generally highly successful, it generally adds significantly to the cost of operation. Finally, it is possible to mechanically remove the affected surface of the membrane thereby exposing fresh surface. Such mechanical treatment adds costs and is obviously limited to operations in which defouling is only infrequently required. In addition, when a sufficient fraction of the ionizable constituents had been removed from the syrup the latter was subjected to evaporation in well-known ways to effect recovery of the crystalloids by concentration and crystallization. However, even after substantially complete removal of the ionizable constituents, it was frequently found that the high molecular weight or colloidal substances present in the syrup interfered with the efficient recovery of pure crystalloids (e.g., sugars).

The second objection to conventional electrodialysis of syrups of electrolytes, colloids and crystalloids is found when the syrup contains a relatively high concentration of colloids. Generally, the presence of electrolytes prevents the efficient winning of pure crystalloid from the syrup, for example, by evaporation and crystallization. This effect is known as "salting-in." In such cases, electrodialysis may be used to permit more efficient recovery of crystalloid. However, it is often found that a relatively high concentration of colloids is more effective and serious in preventing the recovery of pure crystalloid than is the electrolyte content of the syrup.

Figure 2:
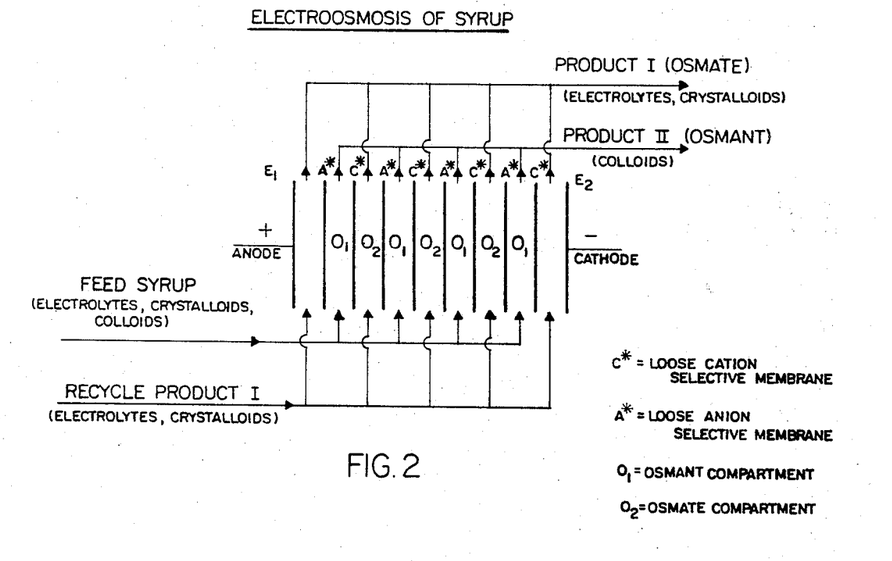
FIGURE 2 is a schematic diagram of one embodiment of this invention for separating crystalloids from a substantially non-fouling aqueous syrup consisting of electrolytes, colloids and crystalloids with novel crystalloid-permeable-colloid impermeable ion selective membranes, that is, with the novel semipermeable ion selective membranes of this invention.

We have found that the latter problem may be solved by the apparatus and process of FIGURE 2 in which an alternating sequence of semipermeable (loose) anion selective and semipermeable (loose) cation selective membranes are arranged between a single set of electrodes $E_1$ and $E_2$. When $E_1$ is an anode, then the syrup of electrolytes, crystalloids and colloids is passed through the denuding or osmant compartments, ($O_1$) that is, those compartments which are bounded on the anode side by semipermeable anion selective membranes and on the cathode side by semipermeable cation selective membranes. Such membranes, also called "loose" membranes are characterized by having characteristic dimensions of interstices which facilitate the electro-osmotic transfer of low molecular weight crystalloids while substantially preventing the transfer of high molecular weight crystalloids and colloids. We have found that membranes which have a fairly high water content will generally be semipermeable for purposes of this invention. For example, when such membranes are used in the electro-osmosis of a syrup containing about 30 percent sucrose, it is found that the liquid transferred electro-osmotically across the membranes will contain as much as 25 percent sucrose or even more. We have found also that such membranes will transport substantially more liquid than the relatively lower water content, impermeable, tight membranes known in the art. For example, such membranes may transport as much as 10 milliliters of liquid per hour per ampere per membrane. Thus, for example, from the syrup containing 30 percent sucrose referred to above, 2.5 grams of sucrose may be transferred per hour per ampere per membrane. By way of comparison, if the electrolyte is sodium chloride then only about 0.75 gram of sodium will be transferred per hour per ampere per cation selective membrane and only about 1.2 grams of chloride will be transferred per hour per ampere per anion selective membrane. The apparatus of FIGURE 2 will efficiently recover crystalloids from the Feed Syrup as shown, if desired, leaving behind almost pure colloids in the processed osmant or denuded stream. The osmate effluent from the osmate compartments, $O_2$, will consist of electrolytes and lower molecular weight crystalloids; colloids and high molecular weight crystalloids will not be present in appreciable quantities. However, if the Feed Syrup contains much less electrolyte than crystalloid it may not be possible to achieve high recoveries of crystalloid from the syrup without adding electrolyte to the syrup since the crystalloid transfer accompanies the electrolyte transfer in the manner pointed out above. Such electrolyte may be added from an exogenous source or recovered endogenously from the osmate (Product 1 in FIGURE 2). This may be accomplished by processing the osmate in the apparatus of FIGURE 1 in which it replaces the Feed Syrup and in which the effluent osmant (Product 11) from FIGURE 2 replaces the Recycle Waste stream. In this way, electrolyte from the osmate may be returned to the osmant. The tight membranes of the apparatus of FIGURE 1 will prevent the substantial transfer of crystalloid from the osmate to the osmant. Such a process and apparatus is shown schematically in FIGURE 3 which is believed to be self-explanatory to one skilled in this art.

Figure 3:
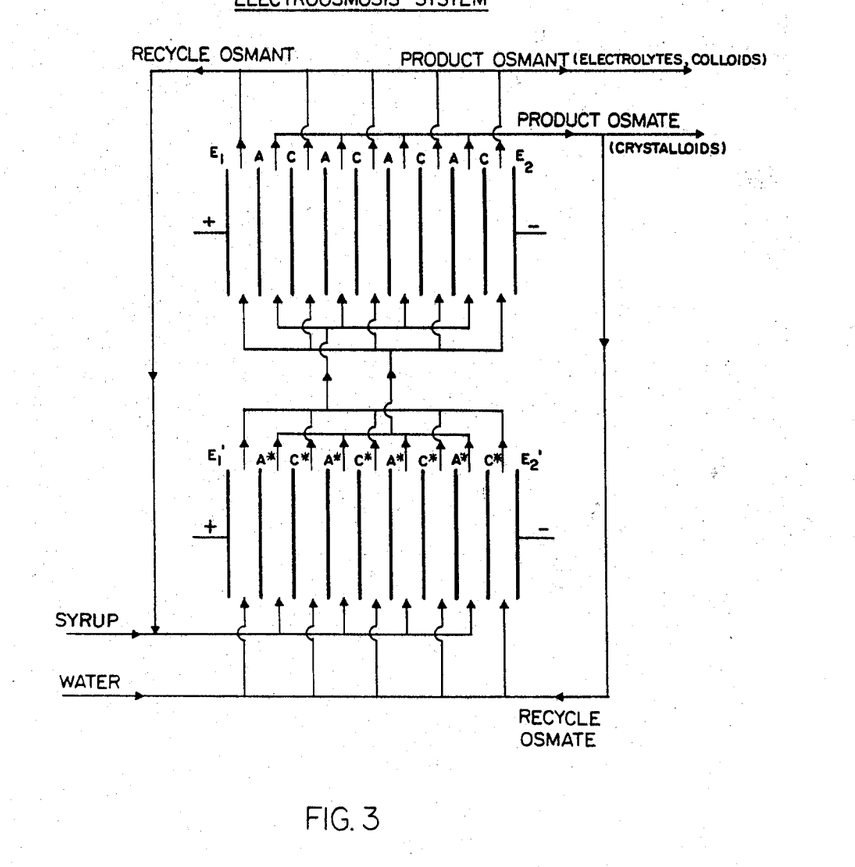
FIGURE 3 is a schematic, diagrammatic representation of a preferred method and apparatus for electrolyte management in an electro-osmosis system.

Referring to the system of FIGURE 3, it will be clear that in the upper conventional electrodialysis apparatus section of said FIGURE 3 about 4 milliliters of water per hour per ampere per membrane will be removed from the osmate which may thereby become more concentrated and/or more viscous than is desirable. For example, if the syrup contains about 30 percent crystalloid then the osmate from the lower section of said apparatus of FIGURE 3 will contain about 25 percent syrup and the osmate effluent from the upper apparatus section may contain as much as 40 or 45 percent crystalloid. It may therefore be expedient to add water to the osmate to reduce the concentration to manageable levels. In FIGURE 3, this water is shown added to the Recycle Osmate from the electrodialysis apparatus though it can be added at any point in the osmate loop. The Product Osmate and Product Osmant are shown as bleeds from the recycles from the electrodialysis apparatus though they may be taken from any point in either the osmate or osmant loops, respectively, as desired. In FIGURES 1, 2 and 3, the flows through the electrode compartments are shown for simplicity as portions of one of the main process streams. It will be understood by one skilled in the art that for either technical or economic reasons, it may be desirable to provide separate electrode streams. In this case, for example, the end membranes of the electro-osmosis apparatus of FIGURES 2 and 3 are preferably tight membranes. It will also be obvious to one skilled in the art that the electro-osmosis (lower section) and electrodialysis compartments (upper section) of FIGURE 3 can be combined between a single set of electrodes in many permutations and combinations without departing from the spirit of the invention. It will also be clear that the number of electrodialysis compartments in FIGURE 3 may be equal, less than, or more than the number of electro-osmosis compartments, depending on various technical and economic factors.

Figure 4:
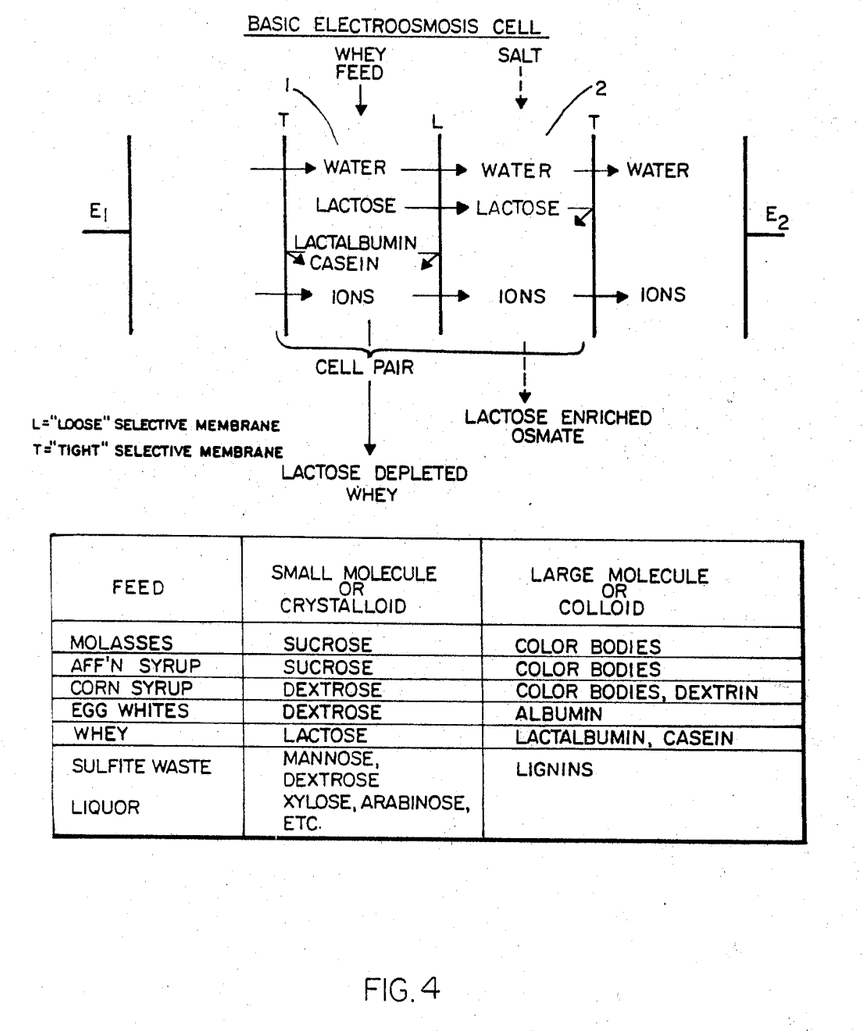
FIGURE 4 is a diagrammatic representation of a simple embodiment of this invention for separating crystalloids from a substantially fouling aqueous syrup consisting of electrolytes, colloids and crystalloids with conventional impermeable (that is, "tight") and novel semipermeable (that is, "loose") membranes.
Figure 5:
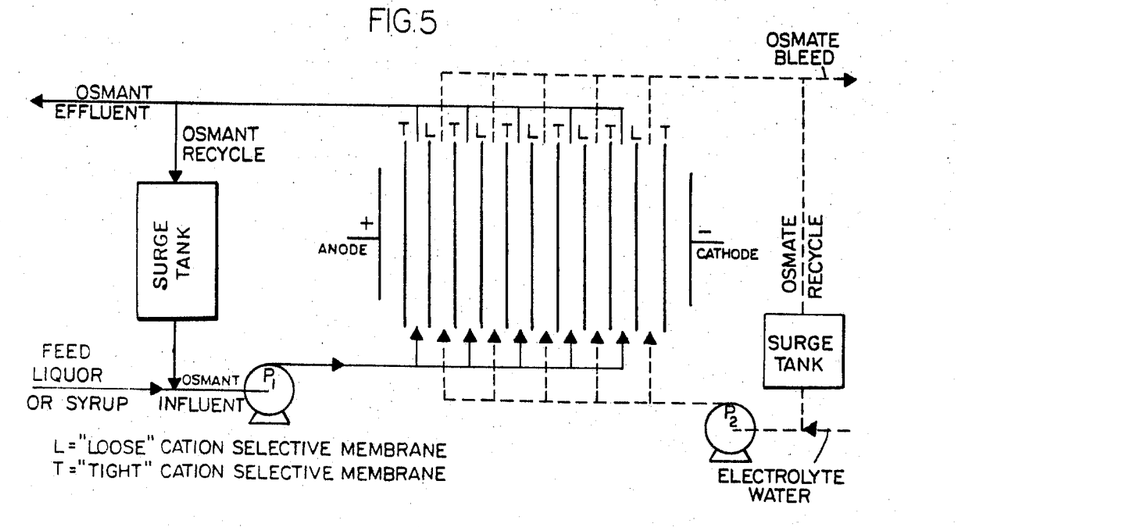
FIGURE 5 is a diagrammatic representation of a multicompartment embodiment of this invention for separating crystalloids from a substantially fouling aqueous syrup consisting of electrolytes, colloids and crystalloids with an alternating sequence of impermeable (tight) and novel semipermeable (loose) ion selective membranes.
Figure 6:
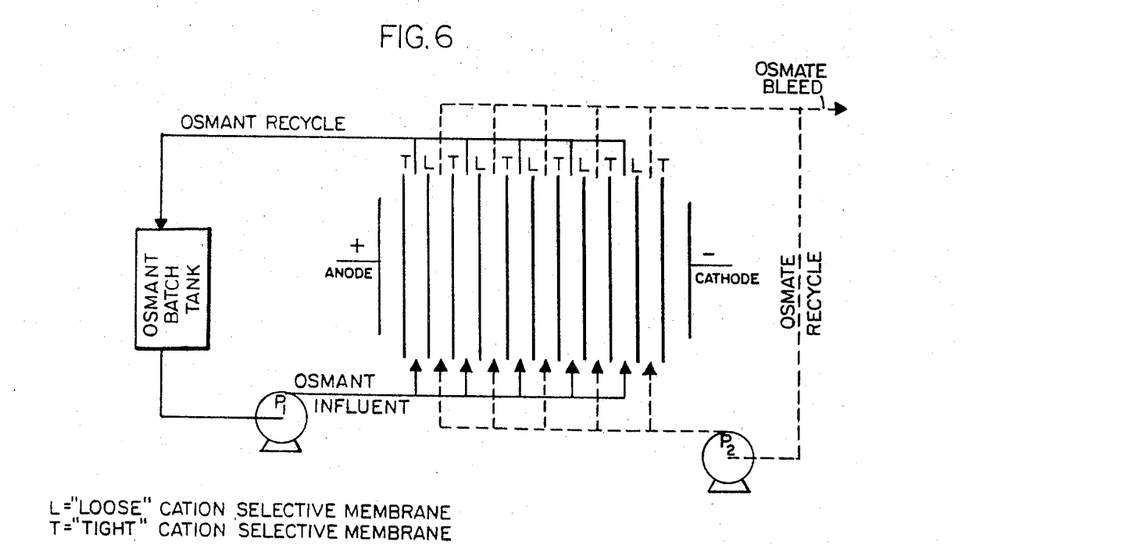
FIGURE 6 is a schematic diagrammatic representation of another perferred method and apparatus of the type shown in FIGURE 5 for electrolyte management in an electro-osmosis system.

Although the apparatus and processes of FIGURES 2 and 3 solve the problem of winning crystalloids from colloids in a particularly efficacious and economical way, they are subject to the debiliating effects of fouling constituents. FIGURES 4, 5 and 6 show preferred ways of carrying out electro-osmosis in the presence of fouling substances or for other technical or economic reasons.

FIGURE 4 represents in broad detail a simple unit or basic cell pair for the separation of crystalloid from colloid in the presence of fouling substances employing the principle of electro-osmosis as included in FIGURES 5 and 6. The unit consists of a "tight" membrane, T, on one side of feed chamber 1, and a "loose" membrane, L, on the other side of said chamber and, as may be apparent from the drawing, additional membranes may be and, in actual practice, are projected into a multi-cell apparatus with end electrode chambers as symbolically indicated in the drawing by $E_1$ and $E_2$.

FIGURE 4 will be described with respect to the separation of lactose from concentrated whey. The unit consists of whey feed chamber 1 and osmate (lactose receiving) chamber 2. If membranes T and L are anion selective membranes, then electrode $E_2$ is an anode and $E_1$ is a cathode and the electric current is carried primarily by anions passing through the compartments and membranes. If the membranes T and L are cation selective membranes, then electrode $E_2$ is a cathode, electrode $E_1$ is an anode, and the electric current is carried primarily by cations passing through the compartments and membranes. The arrangement shown is preferred when the syrup fouls either the anion or the cation selective membranes. In this case, cation selective membranes are chosen if the fouling substance behaves as if it were negatively charged and anion selective membranes are chosen if the fouling substance behaves as if it were positively charged. The fouling substances in many syrups of natural origin behave as if they were negatively charged while the fouling substances in some syrups of industrial origin behave as if they were positively charged. Concentrated whey is relatively non-fouling and either cation or anion selective membranes may be chosen through there is a slight preference for cation selective membranes. Concentrated spent sulfite cooking liquor is relatively strongly fouling for anion selective membranes and cation selective membranes are therefore strongly preferred.

Referring to FIGURE 4, again when $E_1$ is an anode, $E_2$ is a cathode, the T membranes are tight, that is substantially impermeable, cation selective membranes and the L membranes are loose, that is substantially semipermeable, cation selective membranes, the electric current will be carried by cations passing through the membranes. This current will be accompanied by about 4 milliliters of liquid per hour per ampere per tight membrane passing into the osmant whey feed stream and by about 10 milliliters of liquid per hour per ampere per loose membrane passing out of the osmant whey feed stream. The liquid passing through the loose membranes will have almost the same ratio of lactose (low molecular weight crystalloid) to water as is found in the osmant whey stream. Thus, concentrated whey will have about 30 parts of lactose to about 100 parts of water and the liquid passing through the loose membranes may have about 20 to 25 parts of lactose to about 100 parts of water. About 50 parts of this water will be removed from the lactose enriched osmate stream. If the latter consists solely of the net difference between the transfer of the loose and tight membranes, then it will contain about 30 parts of lactose for about 50 parts of water. Generally, it is found that the cation transport number (efficiency) of the tight membrane is greater than that of the loose membrane. This results in a tendency for the osmate stream to become highly demineralized and, thereby develop a poor electrical conductance. This may be taken care of by adding electrolyte to the osmate stream. Even though the osmate consists solely of the net difference in transport between the tight and loose membranes, it is preferable from the technical point of view to recirculate the osmate through the receiving compartments in the apparatus in order to prevent heat build-up and excessive demineralization. Hence, solid or concentrated electrolyte may be dissolved in the recycle osmate stream. If the concentration of crystalloid obtained naturally in the osmate stream is inconveniently high, then it may be desirable to add a substantial amount of water with the electrolyte.

The term Permeability Coefficient as defined herein is a measure of the relative looseness and tightness of a membrane as applied to a particular low molecular weight substance to be separated by electro-osmosis. It is defined as the ratio of grams of crystalloid per gram of water passing through the membrane to the grams of crystalloid per gram of water in the solution from which the crystalloid is transferred. Table 1 shows the Permeability Coefficients of sucrose and dextrose in various Brix concentrations as a function of the water content of the membranes. Generally considered, in this disclosure a relatively loose membrane with respect to sucrose should preferably have Permeability Coefficients of from 0.2 to over 0.9; while a relatively tight membrane with respect to sucrose should preferably have a Permeability Coefficient of not more than about half that of the loose membrane, ideally less than about 0.2. In this way, effective relatively "loose" and "tight" membranes can be established for any particular low molecular weight crystalloid to be separated from colloids, or even from other low molecular weight crystalloids, by the principles of the present invention.

of high molecular weight substance. Both liquid streams must contain electrolytically conducting species, e.g., they should preferably have an electrolyte concentration in the range of about 0.1 to about 1.0 N. The operating temperature may be in the range of about 0° to about 100° C. and is preferably in the range of about 35° to about 85° C. At a current density of about 200 amperes per square foot of loose membrane area about 4 pounds of liquid per hour will be transferred per square foot of such membrane. This liquid will contain about 0.4 pound of crystalloid per hour per square foot when the concentrated liquor is about 10 percent crystalloid. Simultaneously, about 2 pounds of liquor per hour will be transferred per square foot of impermeable membrane. This latter liquid, however, will not contain any substantial

TABLE 1.—PERMEABILITY COEFFICIENT OF TYPICAL CATION AND ANION EXCHANGE MEMBRANES

| Type | Water content [1] | Composition of membrane | Sugar | Brix | Permeability coefficient | Water transfer, milliliters per hour per ampere |
|---|---|---|---|---|---|---|
| A | 1.20 | Polystyrene sulfonate | Sucrose | 10 | 0.6 | 10 |
| B | 1.20 | do | Dextrose | 10 | 0.8 | 10 |
| C | 0.50 | do | Sucrose | 30 | 0.01 | 4 |
| D | 0.50 | do | Dextrose | 10 | 0.06 | 4 |
| E | 0.85 | do | Sucrose | 30 | 0.04 | 8 |
| F | 0.60 | do | do | 30 | 0.12 | 6 |
| G | 1.20 | Vinyl quaternary ammonium. | do | 30 | 0.5 | 6 |
| H | 0.65 | do | do | 30 | 0.05 | 3 |

[1] Approximate grams of water per gram of bone dry ion exchange resin component.

The above Table 1 is directed to the Permeability Coefficients of typical cation and anion selective membranes specifically with respect to sucrose and dextrose transfer but it will be apparent that similar tables can be prepared for other crystalloids with respect to other types of ion selective membranes. It will also be apparent from Table 1 that generally the loose ion exchange membranes have a permeability coefficient in the range of about 0.2 to 0.9 and the tight ion exchange membranes have a permeability coefficient of less than about ½ the permeability of the loose membranes.

FIGURE 5 is a typical multicompartment electro-osmosis apparatus utilizing the concept of FIGURE 4 and consists of a pair of end electrodes, anode and cathode, separated by alternating "loose" cation selective membranes L and tight cation selective membranes T. The loose membranes L are substantially permeable to soluble low molecular weight un-ionized substances (e.g., xylose, sucrose, dextrose, lactose, etc.), but substantially impermeable to high molecular weight substances (e.g., lignin, dextrin, color bodies, proteins, etc.). The tight membranes T are substantially impermeable to both the low and the high molecular weight substances. Both membranes are electrolytically conducting, in the case of FIGURE 5, by means of cations. Although not shown in the drawing, the usual electrolyte solution such as sodium or potassium sulfate is passed through the end electrode chambers. The passing of a D.C. electric current through the membranes with the simultaneous passing of a concentrated liquor, for example molasses containing sucrose, colloids and some electrolyte through the feed chambers defined by said cation exchange membranes, causes an electro-osmotic flow of liquid, generally more through the "loose" (semi-permeable) membranes than through "tight" (impermeable) membrane. For example, the "loose" membrane may pass about 10 milliliters per hour per ampere and the "tight" membrane about 4 milliliter per hour per ampere. The electro-osmotic flow through the loose membrane includes the low molecular weight substance at approximately the same concentration as the solution from which the flow originates. The electro-osmotic flow through the impermeable membrane does not include the low molecular weight substance. Neither flow is accompanied by the permeation of substantial amounts amount of crystalloid. Thus, about 2 pounds of liquid per hour per square foot of membrane surface will accumulate in the syrup chambers which will have a concentration of about 20 percent crystalloid. Power consumption will be about 400 watts per square foot or even less. In practical operation, the concentrated liquor will decrease in concentration during the electro-osmosis and the concentrated syrup may therefore be less concentrated than 20 percent on the average.

The process shown schematically in FIGURE 5 operates continuously on what is referred to as a "feed and bleed" cycle, that is:

(a) The osmant and osmate are continuously recycled, the former through a surge tank;

(b) A portion of the osmant is continuously removed ("osmant bleed") as effluent and replaced with the liquid which is to be subjected to electro-osmosis (influent osmant, "osmant feed"); and (c) A portion of the osmant is continuously removed ("osmant bleed") as effluent and replaced with water or other liquid (influent osmate, "osmate feed").

The osmate feed may, if desired, consist wholly or in part of mother liquor from an evaporator-crystallizer or other apparatus or process used to recover the low molecular weight substantially unionized material from the osmate bleed. Such mother liquor may constitute at least a part of the electrolyte and water feed to the osmate stream. Generally at least part of the osmate feed will consist of water and electrolyte from other sources. For example, the water may be, in part, that condensed in the above-mentioned evaporator-crystallizer or other apparatus used to recover the low molecular weight material from the osmate bleed.

It will be also understood that if the concentration of low molecular weight crystalloid in the osmant is not too high, then it may not be necessary to feed any water to the recirculating osmate stream though it will generally be desirable to recycle the osmate. In this case the water in the osmate bleed consists solely of water which was transferred electrically across the membranes. It will also be understood that, particularly in large plants, it may be desirable to operate with little or no recycle in either osmate or osmant streams or both. This is referred to as continuous or substantially continuous operation. Such a plant may consist of two or more sets of alternating semipermeable and impermeable membranes, each set of which performs more or less as a unit. The sets may be arranged between a single pair of electrodes though generally only one or two sets will be arranged between a single pair of electrodes. The sets may be in series or in parallel or partly in series and partly in parallel with respect to the flow of electric current, osmant and/or osmate. Thus in large plants, the flow of osmant will generally be both in parallel and in series through a large number of membrane sets; the osmate flow will generally be on a partial recycle basis through all the sets in parallel though often it will be partly in parallel and partly in series in a composite direction from set to set which is substantially countercurrent to the flow of osmant through the plant. The flows of osmant and osmate in each set of membranes will usually be in parallel and cocurrent. In large plants the flow of electric current will usually be in parallel through the several sets of membranes though under some conditions the flow will be partly in series and partly in parallel. Finally in any plant, the flows of either osmant or osmate or both may be batch recycle. In this case a surge or batch tank is located in the recycle line. Periodically the batch tank is substantially emptied and another lot of osmate or osmant is admitted to the system. In the case of the osmate, the electrical transport of liquid across the membranes may be the sole source of replacement for the contents of the osmate batch tank. In a batch process the flow of either osmate or osmant or both may be in series or parallel or partly in series and partly in parallel through an array of several sets of membranes each set performing more or less as a unit. Further, although one stream may be operating in a batch mode, the other stream may be operating in a "feed and bleed" or in a continuous mode. FIGURE 6 is a schematic representation of a typical operation in which the osmant stream is processed batch and the osmate flows feed-and-bleed.

The apparatus of FIGURES 5 and 6 will efficiently recover crystalloid from the Feed Syrup as shown, if desired, leaving behind almost pure colloid in the processed osmant or denuded stream. The osmate will consist of electrolytes and low molecular weight crystalloids; colloids and high molecular weight crystalloids will not be present in appreciable quantities. As compared with the process and apparatus of FIGURE 2, those of FIGURES 5 and 6 have the advantage that they may be used with strongly fouling syrups and that will produce a concentrated (in crystalloid) osmate from a dilute osmant. If the osmant is relatively concentrated in crystalloids then it may be necessary to add water to the osmate stream as shown in FIGURE 5 to keep the concentration of the osmate within desired limits. Further, if the Feed Syrup contains much less electrolyte than crystalloid, it may not be possible to achieve high recoveries of crystalloid from the syrup without adding electrolyte to the syrup, since the crystalloid transfer accompanies the electrolyte transfer in the manner pointed out above. Such electrolyte may be added from an exogenous source or received endogenously from the osmate effluent.

The management of electrolyte is particularly important in electroosmosis as has been discussed above. With commercially available ion selective membranes the water transfer through the semipermeable membranes is substantially greater than that through the impermeable membranes. This results in a net transfer of water to the osmate compartments and tends to decrease the electrolyte concentration in those compartments and increase it in the osmate compartments. The electrical resistance of the osmate compartments may therefore increase to impractically high values. This may be overcome by adding electrolyte from endogenous or exogenous sources but with the penalty of additional costs. It is also possible for the water transfer of the semipermeable membrane to be less than that of the impermeable membrane in which case the osmant compartments tend to become electrically resistant and require the addition of electrolyte. We have found that this tendency for one of the compartments to become electrically resistant may be overcome at least in part if those membranes having the higher water transfer also have the higher transport number. The transport number for a cation selective membrane is the number of chemical milliequivalents of cations transferred through the membrane per hour for each ampere of current. For an anion selective membrane it is similarly defined as the number of chemical equivalents of anions per hour per ampere. Generally we have found that transport numbers of commercial ion selective membranes lie in the range of about 20 to about 40 milliequivalents per hour per ampere. Therefore if the membrane has a relatively high water transfer we prefer it to have a transport number in the range of about 30 to about 40. The membrane having a relatively low water transfer preferably has a lower transport number. We have found empirically that the difference between the transport numbers should preferably be from about 0.2 to about 2 times the difference between the water transfers. Thus, for example, if the semipermeable membrane has a water transfer of about 10 milliliters per hour per ampere and a transport number of about 35 milliequivalents per hour per ampere and if the impermeable membrane has a water transfer of about 6 milliliters per hour per ampere then it is preferred that it have a transport number in the range of about 27 to about 34 milliequivalents per hour per ampere. For practical membranes the transport number for the membrane having the lower water transfer should preferably be in the range of about 1 to about 20 units less than that of the membrane having the higher water transfer. It should be understood that in many cases it will be economically possible to operate outside the preferred range, for example, by adding electrolyte or by recovering only part of the available low molecular weight crystalloid.

The following examples are illustrative of the practice of the invention and are not for the purpose of limitation:

EXAMPLE 1

Recovery of lactose from whey molasses

A 2.38 liter sample of concentrated partially delactosed whey (whey molasses) was processed in the electro-osmosis apparatus of FIGURE 6 wherein the tight and loose membranes were cation selective membranes of the well known sulfonated crosslinked polystyrene matrix type. There were 20 membranes employed involving 10 osmate compartments and an effective cation surface area of 210 sq. cm. per membrane.

The membranes had the characteristics shown in the table:

|  | Impermeable [6] | Semipermeable [7] |
|---|---|---|
| Water content [1] | 0.50 | 1.20 |
| Capacity [2] | 2.5 | 2.5 |
| Resistance [3] | 12 | 12 |
| Water transfer [4] | 4 | 10 |
| Transport number [5] | 32 | 24 |

[1] Grams per gram of dry ion exchange resin.
[2] Milliequivalents per gram of dry ion exchange resin.
[3] Ohms per squre centimeter.
[4] Milliliters per hour per ampere.
[5] Milliequivalents per hour per ampere.
[6] Type C, Table 1.
[7] Type A, Table 1.

At an average current (76 milliamperes per square centimeter) about 50% of the lactose was transferred from the whey into the osmate stream in 3 hours, at about 1.25 volts per membrane pair and 105° F. The lactose concentration on a dry solids basis increased substantially in the osmate product over the concentration in the delactosed whey, while the concentration of the other components of the whey was substantially reduced, as shown in the Table 2.

TABLE 2.—COMPOSITION OF WHEY AND OSMATE

| Percent (dry basis) | Delactosed whey (Osmant) | | Osmate |
|---|---|---|---|
| | Initial | Final | |
| Lactose | 51.5 | 28.8 | 90.6 |
| Protein | 21.2 | 21.6 | 4.1 |
| Total ash | 16.4 | 34.7 | 5.3 |
| Calcium | 1.27 | 1.88 | <0.05 |
| Sodium chloride | 6.38 | 22.7 | 4.9 |
| Non-NaCl ash | 10 | 12 | 0.5 |
| Acidity | 2.58 | 2.78 | 0.24 |
| Total solids | 29.8 | 30.9 | 14.5 |

While 50% of the lactose in the delactosed whey feed was transferred to the osmate stream, only about 5.5% of the protein was transferred along with the lactose, and there was some de-ashing of the lactose transferred, as shown in the table. The sodium chloride present in the osmate resulted from the addition of salt to the osmate stream to maintain electrical conductivity. Some of the salt was transferred electrically into the osmant or de-lactosed whey stream, during the run. The need for the addition of salt to the osmate stream can be eliminated by using a conductive material in the osmate cells such as ion exchange material, to impart electrical conductivity. The calcium content and the non-sodium chloride ash in the osmate are considerably lower than in the delactosed whey. The acidity (lactic acid and citric acid) was also considerably reduced in the osmate.

The lactose concentration in the osmate was slightly lower than in the initial delactosed whey because the osmate cells were initially at zero lactose concentration, and steady state was not reached during the run. Based on the amount of liquid transferred during the run from the osmant to the osmate and based on the total amount of sugar transferred, the average concentration of the net liquid transferred was close to 400 grams of lactose per liter. About 20% of the water in the delactosed whey was transferred into the osmate by electro-osmosis.

The D.C. energy consumption was 2.7 kilowatt-hours per pound of lactose transferred and the rate of lactose transfer was 0.066 pound per hour per square foot of effective semipermeable membrane.

EXAMPLE 2

Recovery and concentration of lactose from partially de-lactosed whey

About 50% of the lactose was recovered continuously from partially de-lactosed whey (whey molasses) using the electro-osmosis apparatus shown in FIGURE 5. The D.C. current was 16 amperes (76 milliamperes per square centimeter) at about 1.25 volts per membrane and at 105° F.

The lactose concentration on a dry-solids basis increased substantially in the osmate product over the concentration in the de-lactosed whey feed.

Partially de-lactosed whey containing 170 grams lactose per liter and about 50% lactose on solids was fed at a rate of 10.5 milliliters per minute into the osmant stream loop and osmant was withdrawn at 7.5 milliliters per minute. The concentration of lactose in the osmant bleed was 119 grams per liter and about 30% on a dry solids bassi.

Osmate product was collected at a rate of 3 milliliters per minute. The lactose concentration in the osmate product was 300 grams per liter. The lactose concentration on a dry solids basis was 90%.

Salt was added to the osmate stream to maintain electrical conductivity. Most of the salt added was transferred to the whey stream.

The energy consumption was 3.4 kilowatt-hours per pound of lactose transferred and the rate of lactose transfer was 0.052 pound per hour per square foot of effective semipermeable membrane. The membranes were types A and C of Table 1.

EXAMPLE 3

Recovery and concentration of lactose from partially de-lactosed whey elimination of salt addition The apparatus shown in FIGURE 5 was modified by replacing two of the ten "tight" cation selective membranes with "loose" anion selective membranes. About 50% of the lactose was recovered continuously from delactosed whey using the modified apparatus under the conditions of operation described for Example 2. The need for addition of salt was eliminated by the presence of the two anion membranes in the stack.

The results were essentially identical to those of Example 2 except that the production rate was increased about 15–20% and the energy consumption decreased by the same amount by the afore-mentioned modification of the apparatus. The tight cation membranes were type C of Table 1; the loose cation membranes were Type A; and the loose anion membranes were Type G.

EXAMPLE 4

Recovery of wood sugars from sulfite waste liquor

A 2.38 liter sample of magnesium-base sulfite waste liquor was processed in the electro-osmosis apparatus shown in FIGURE 6. The solids concentration in the liquor was 41% and the sugar concentration was 8.3%. At an average current of 11 amperes (52.5 milliamperes per square centimeter) about 30% of the sugar was transferred from the sulfite waste liquor to the osmate stream in 2 hours, at about 2 volts per membrane and 140° F.

The sugar concentration on a dry solids basis increased from about 19% in the sulfite waste liquor to 72% in the osmate product (see Table 3 below). The sugar concentration in the sulfite waste liquor decreased by 32%, but the total solids concentration decreased only 2.5%, because of salt added to the osmate during the test. Most of the salt added was transferred electrically to the sulfite waste liquor.

As in the case of lactose recovery from partially de-lactosed whey, the sugar concentration in the osmate was slightly lower than in the initial sulfite waste liquor because the osmate cells were filled initally with a salt solution containing no sugar, and steady state was not reached during the run. Actually there was a net transfer of liquid from the osmate to the osmant (about 5% of the osmant volume), while the sugar was transferred from the osmant to the osmate. After 30% of the sugar was transferred, the sugar concentration in the osmate was higher (85 milligrams per milliliter) than in the final sulfite waste liquor (70 milligrams per milliliter), demonstrating that sugar can be concentrated by electro-osmosis.

The D.C. energy consumption was 6.6 kilowatt-hours per pound of sugar transferred and the rate of sugar transfer was 0.03 pound per hour per sq. ft. of effective semipermeable membrane. The membranes were Types A and C of Table 1.

TABLE 3.—COMPOSITION OF SULFITE WASTE LIQUOR (OSMANT) AND OSMATE

| Percent (dry basis) | Sulfite waste liquor (Osmant) | | Osmate |
|---|---|---|---|
| | Initial | Final | |
| Wood sugars | 19 | 13.5 | 72 |
| Total ash | 8-12 | | 6.8 |
| Magnesium | 4-7 | | 1.2 |
| Lignin | 60-70 | | 21 |
| Percent: | | | |
| Wood sugars | 7.9 | 5.4 | 7.3 |
| Other solids (diff) | 33.2 | 34.7 | 2.9 |
| Total solids | 41.1 | 40.1 | 10.2 |

EXAMPLE 5

Recovery and concentration of lactose from partially de-lactosed whey all anion membrane system The apparatus shown in FIGURE 5 was altered by substituting Type G anion selective membranes for the Type A cation selection membranes and Type H anion selective membranes for the Type C cation selective membranes.

About 50% of the lactose was recovered continuously from de-lactosed whey using this apparatus at a D.C. current of 16 ampers at about 1.5 volts per membrane and 105° F.

The lactose concentration on a dry-solids basis was increased substantially in the osmate product over the concentration in the de-lactosed whey feed.

Partially de-lactosed whey containing 170 grams of lactose per liter and about 50% lactose on a dry-solids basis was fed at a rate of 7.5 milliliters per minute into the osmant stream loop and osmant was withdrawn at 4.5 milliliters per minute. The concentration of lactose in the osmant bleed was 140 grams per liter, and about 30% on a dry-solids basis.

Osmate product was collected at a rate of 3 milliliters per minute. The lactose concentration in the osmate was 210 grams per liter, and about 90% on a dry-solids basis.

Salt was added to the osmate to maintain electrical conductivity. Most of the salt added was transferred to the whey stream.

The energy consumption was 5.7 kilowatt-hours per pound of lactose transferred, and the rate of lactose transfer was 0.037 pound per hour per square foot of effective semipermeable membrane.

EXAMPLE 6

Recovery and concentration of lactose from partially de-lactosed whey cation-anion membrane systems Part 1.—About 50% of the lactose was removed continuously from partially de-lactosed whey using the electro-osmosis apparatus shown in FIGURE 3. The D.C. current was 16 amperes (76 milliamperes per square centimeter) at about 1 volt per membrane and at 105° F.

Salt was added to the osmant stream to replace the salt transferred into the osmate stream. Slightly over 1 lb. salt was added per lb. lactose transferred.

Partially de-lactosed whey containing 170 grams of lactose per liter and about 50% lactose on a dry-solids basis was fed at a rate of 36 milliliters per minute into the osmant stream loop and osmant was withdrawn at 13 milliliters per minute. The concentration of lactose in the osmant was 240 grams per liter, about 40% on a dry-solids basis. The de-lactosed whey product consisted mostly of residual lactose, proteins and residual salt (NaCl), with substantial removal of lactic and citric acids.

Osmate product was collected at a rate of 23 milliliters per minute. The lactose concentration in the osmate product was 130 grams per liter, and about 40% on a dry-solids basis. The balance of solids consisted of most of the lactic and citric acid originally present in the whey, salt (NaCl) and about 1% "proteins" (6.25 x N) on a dry-solids basis.

The energy consumption was 0.8 kilowatt-hour per pound of lactose transferred and the rate of lactose transfer was 0.18 pound per square foot of effective cation membrane. The membranes were Types A and G of Table 1.

Part 2.—The osmate product was de-ashed by electrodialysis using a 10 cell pair stack equipped with "tight" Types C and H membranes at a current of 12 amperes and a voltage of 2 volts per membrane at 105° F.

The concentration of lactose in the desalted osmate product increased to about 300 grams per liter as a result of electro-osmotic transfer of water through the "tight" membranes. The osmate was fed at a rate of 23 milliliters per minute from the electrodialysis separation stack and withdrawn at 10 milliliters per minute from the desalting stack. The concentration of lactose on a dry basis increased to over 90% in the desalted osmate.

About 2% of the lactose was transferred to the brine stream. Water was fed at 8.6 milliliters per minute to the concentrating cells and 18% salt was withdrawn at about 21 milliliters per minute. Most of the lactic and citric acid in the osmate was transferred to the brine stream.

About 1.3 pounds of salt was removed from the osmate per pound of lactose present.

The energy consumption for the combined electro-osmosis and electrodialysis operation was 2 kilowatt-hour per pound of lactose transferred and the production rate was 0.09 pound of lactose per hour per square foot of effective cation selection membrane.

Part 3.—About 75% of the brine from the electrodialysis step was recycled into the de-lactosed whey feed.

The percent lactose transferred dropped from 50% to 30% of the lactose in the feed whey because of the dilution of lactose in the whey with recycled brine. The concentration of lactose in the de-lactosed whey product dropped from 240 grams per liter to 145 grams per liter and from 300 to 180 grams per liter in the desalted osmate.

The energy consumption for the combined electro-osmosis and electrodialysis operation was about 3 kilowatt-hour per pound of lactose transferred and the production rate was about 0.054 lb. per hour per square foot of effective cation selective membrane.

Part 4.—Instead of water, the partially de-lactosed whey feed to the electro-osmosis stack was flowed through the concentrating cells of the electrodialysis desalting stack.

The results were nearly identical to those obtained in Part 3 of this example, except that there was no concentrated brine generated in the osmate desalting stack. The lactic and citric acid content of the whey was not changed appreciably.

EXAMPLE 7

Recovery of sugar from affination syrup

A 2.36 liter sample of 40 Brix affination syrup was processed batchwise in the electro-osmosis apparatus shown in FIGURE 6 except that 7 membranes of each type were used instead of 10.

At an average current of about 24 amperes (115 milliamperes per square centimeter) about 70% of the sucrose was transferred from the syrup to the osmate stream in about 3 hours, at 1.5 to 2.0 volts per membrane and 130° F.

The coloring matter in the sugar in the osmate was reduced by 50–70%. The average concentration of sugar in the osmate was 300 grams per liter and the peak concentration was about 360 grams per liter.

About 60% of the water was transferred electrically from the syrup to the osmate stream. The final sugar concentration in the syrup was about 300 grams per liter.

There was a net electrical transfer of salt from the osmate to the syrup. About 0.15 pound of salt was added to the osmate (as saturated NaCl) per pound of sugar transferred.

The energy consumption was about 1 kilowatt-hour per pound of sugar transferred and the production rate was about 0.3 pound of sugar per hour per square foot of cation selective membrane.

The foregoing disclosure is intended to be illustrative of representative and preferred forms of the present invention. In the claims appended hereto where elements of the method and apparatus are referred to generically, it is intended that such reference shall embrace the corresponding elements described in the disclosure and equivalents thereof. It is intended that the claims shall cover and embrace the invention both generically and specifically, the disclosure being illustrative and the invention to be accorded the full scope of the claims.

We claim:

1. The electro-osmosis method of separating low molecular weight substantially un-ionized substances from a liquid mixture containing higher molecular weight substances comprising: passing said liquid mixture through a first feed chamber of an electro-osmosis cell comprising at least two chambers defined between ion exchange membranes having alternating high and low permeability coefficients with respect to each other, passing a direct electric current transversely through said membranes and chambers in a direction to cause the low molecular weight substances to pass from said feed chamber through said high permeability coefficient membrane into a second chamber with said low molecular weight substances being substantially retained in the second chamber, and recovering the effluents from both chambers.

2. The method of claim 1 wherein the feed liquid is selected from the group consisting of molasses, affination syrup, egg whites, whey molasses, partially delactosed whey, and pulping waste liquor.

3. The method of claim 1 wherein a batch separation of the low molecular weight substances is effected in a multi-chamber cell.

4. The method of claim 1 wherein a continuous separation of the low molecular weight substances is effected in a multi-chamber cell.

5. The method of claim 1 wherein a part of the effluent from at least one of said two chambers is recycled.

6. The method of claim 1 wherein an electrolyte solution is passed through said second chamber.

7. The method of claim 1 wherein the low molecular weight substances are crystalloids selected from the group consisting of sucrose, dextrose, lactose, wood sugars, and mixtures thereof, and the higher molecular weight substances are colloids selected from the group consisting of proteins, albumin, syrup color bodies, casein, polysaccharides, lignin, dextrin, and mixtures thereof.

8. The method of claim 1 wherein the high permeability coefficient ion exchange membranes have a coefficient of about 0.2 to about 0.9 and the low permeability coefficient ion exchange membranes have a coefficient of less than about ½ the permeability of said former membrane.

References Cited

UNITED STATES PATENTS 2,758,965   8/1956   Block et al. ________ 204—180

OTHER REFERENCES

Ionics Bulletins: L–2, L–2S–2, AR111, AR111.1, CR61, CR61.1.

Rohm & Haas Bulletins A–1, C–1.

JOHN H. MACK, *Primary Examiner.*

A. C. PRESCOTT, *Assistant Examiner.*

U.S. Cl. X.R.

204—301